United States Patent
Matsa et al.

(10) Patent No.: US 8,621,475 B2
(45) Date of Patent: Dec. 31, 2013

(54) RESPONSIVE TASK SCHEDULING IN COOPERATIVE MULTI-TASKING ENVIRONMENTS

(75) Inventors: Moshe Morris Emanuel Matsa, Cambridge, MA (US); Patrick R. McManus, Warren, ME (US); Charles R. Morgan, Topsfield, MA (US)

(73) Assignee: International Business Machines Corporation, Armonk, NY (US)

( * ) Notice: Subject to any disclaimer, the term of this patent is extended or adjusted under 35 U.S.C. 154(b) by 1505 days.

(21) Appl. No.: 11/952,042

(22) Filed: Dec. 6, 2007

(65) Prior Publication Data

US 2009/0150891 A1 Jun. 11, 2009

(51) Int. Cl.
*G06F 9/46* (2006.01)
(52) U.S. Cl.
USPC .......................................................... 718/103
(58) Field of Classification Search
None
See application file for complete search history.

(56) References Cited

U.S. PATENT DOCUMENTS

| | | | | | |
|---|---|---|---|---|---|
| 5,247,677 | A | * | 9/1993 | Welland et al. | 718/103 |
| 5,850,536 | A | * | 12/1998 | McLain, Jr. | 703/21 |
| 6,052,707 | A | * | 4/2000 | D'Souza | 718/106 |
| 6,971,091 | B1 | * | 11/2005 | Arnold et al. | 717/145 |
| 2006/0085793 | A1 | * | 4/2006 | McKenney | 718/100 |
| 2006/0212874 | A1 | * | 9/2006 | Johnson et al. | 718/107 |
| 2006/0265712 | A1 | * | 11/2006 | Zhou et al. | 718/102 |
| 2007/0136729 | A1 | * | 6/2007 | Neuman | 718/102 |

OTHER PUBLICATIONS

Efficient User-Space Protocol Implementations with QoS Guarantees Using Real-Time Upcalls R. Gopalakrishnan and Gurudatta M. Parulkar IEEE/ACM Transactions on Networking, Vol. 6, No. 4 Published: Aug. 1998.*
Bringing Real-time Scheduling Theory and Practice Closer for Multimedia Computing R. Gopalakrishnan and Gurudatta M. Parulkar Published: 1996.*
Windows Multitasking Jeff Prosise PC Magazine vol. 13, Num. 9, p. 261-264 May 1994.*
Jikes Research Virtual Machine Design and Implementation of a 64-bit PowerPC Port Sergiy Kyrylkov The University of New Mexico, pp. vi, vii, 1-10 Published: Dec. 2003.*

* cited by examiner

*Primary Examiner* — Emerson Puente
*Assistant Examiner* — Paul Mills
(74) *Attorney, Agent, or Firm* — Steven L. Nichols; Van Cott, Bagley, Cornwall & McCarthy P.C.

(57) ABSTRACT

Task scheduling in cooperative multi-tasking environments is accomplished by a task scheduler that evaluates the relative priority of an executing task and tasks in a queue waiting to be executed. The task scheduler may issue a suspend request to lower priority tasks so that high priority tasks can be executed. Tasks are written or compiled with checks located at opportune locations for suspending and resuming the given task. The tasks under a suspend request continue operation until they reach a check, at which point the task will suspend operation depending on specific criteria. By allowing both the task and the task scheduler to assist in determining the precise timing of the suspension, the multi-tasking environment becomes highly efficient and responsive.

15 Claims, 4 Drawing Sheets

RESPONSIVE TASK SCHEDULING IN COOPERATIVE MULTI-TASKING ENVIRONMENTS

BACKGROUND OF THE INVENTION

In modern computing environments, computer systems are generally required to multi-task, meaning that the computer systems can handle a number of different tasks or processes at the same time. Additionally, the various tasks and processes to be completed may each have a different relative priority based on a number of different factors.

More of the computing environment's resources should be made available sooner for higher priority tasks. Ideally computer systems in these multi-tasking environments can efficiently switch between lower priority tasks to higher priority tasks to deliver maximum utility to the user or users. When a high priority task is waiting to be executed, the time spent waiting for a computer to perform a task that is low priority results in an inefficient use of resources.

BRIEF SUMMARY OF THE INVENTION

A computer program product for a task that is to execute within a cooperative multi-tasking environment includes a computer usable medium having computer usable program code embodied therewith, the computer usable program code comprising computer useable program code configured to perform a desired task; and computer useable program code, within the code configured to perform the task, that is configured to check for a suspend request from a scheduler based on what action the task is currently performing.

A computer program product for scheduling tasks within a cooperative multi-tasking environment includes a computer usable medium having computer usable program code embodied therewith, the computer usable program code comprising computer usable program code configured to act as a task scheduler, the task scheduler being configured to monitor a relative priority of tasks currently in operation or in a queue. The task scheduler is further configured to make a suspend request to a lower priority task so that a higher priority task can be performed. The task scheduler is configured to allow the lower priority task to continue running until the lower priority task yields to the suspend request.

A method of handling multiple tasks in a cooperative multi-tasking environment includes issuing a suspend request with a scheduler to an executing task when a higher priority task is waiting in a queue; and allowing the executing task to comply with or temporarily ignore the suspend request based on an action occurring in the task.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Figure 1:
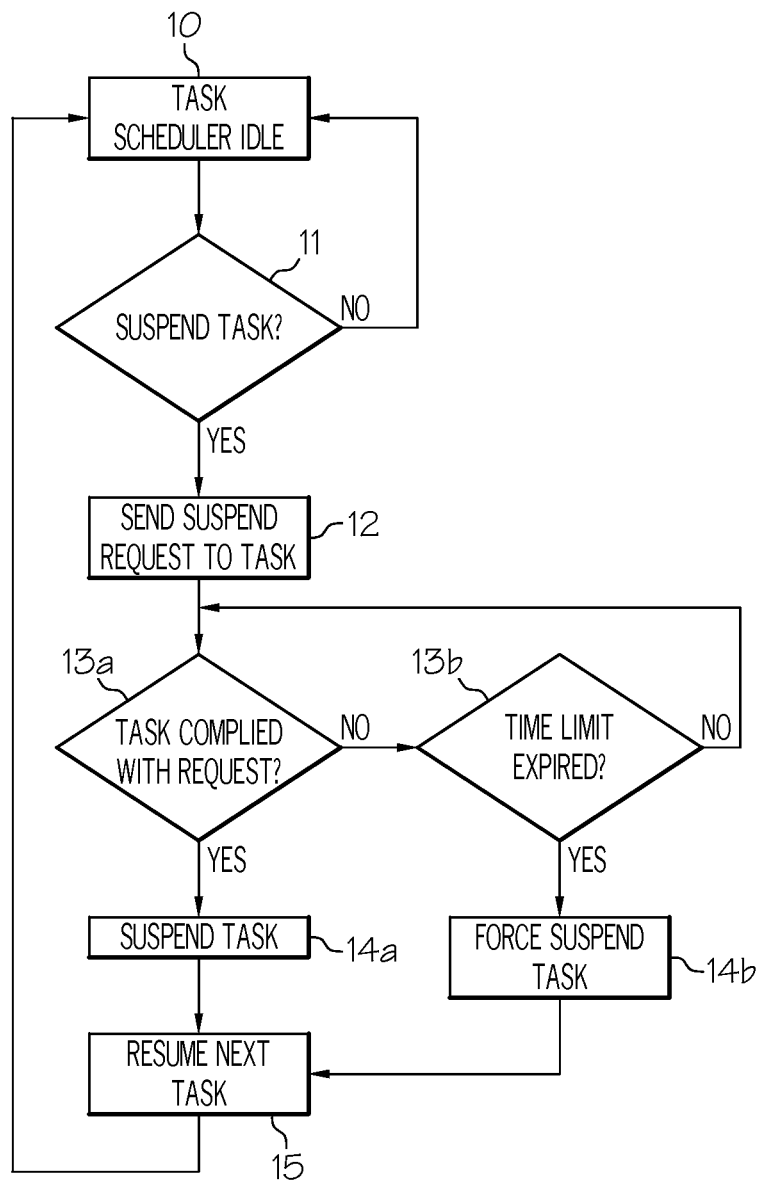
FIG. 1 is an illustrative flow chart which depicts one exemplary process by which a task scheduler may interact with a running process to efficiently suspend the running process, according to principles described herein.

The drawings are only intended to clarify the function of the invention in light of one particular example. They are not intended to represent any particular order in which specific functions of the invention should occur. Further, the drawings are not intended to imply that certain events within the drawings can occur only a limited number of times. The drawings are only meant to illustrate a particular example. Identical reference numbers in various figures represent similar, but not necessarily identical, elements.

DETAILED DESCRIPTION OF THE INVENTION

The present specification describes systems and methods for deciding when to suspend and resume competing, differently prioritized tasks in a real-time operating environment where stringent time performance requirements are specified, for example, an extensible stylesheet language transformations (XSLT) Web Services server. The present specification describes systems and methods that increase the efficiency of task execution by minimizing timing consumed by suspending and resuming tasks, thus allowing for more stringent requirements to be met by the system. More specifically, the present specification describes methods and system in which tasks or processes are written so as to periodically check for a suspend request from a scheduler and yield to the suspend request, if made, at particular points within the task when it would be efficient to accept a suspend request. Because the check for the suspend request is based on what is occurring with the task, the task can be written, including the suspend request checks, without knowledge of a particular computing environment, scheduler or Quality of Service (QoS). Thus, the present specification describes ways to cause a task to yield to a suspend request at few enough points to maintain high-performance while at the same time appropriately placing those yield points to provide quick yielding from any QoS request. With this invention, all of this can be done even in the context of compiled XSLT and Web Services processing.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The task scheduler and suspend checks described herein, which are included in various task code, typically execute while stored in Random Access Memory (RAM). However, prior to actual implementation, the instructions, software or code may be stored on any computer-usable or computer-readable medium. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

The present specification describes operations that occur at the machine instruction level by the insertion of instructions, e.g., checks for suspend requests, into the programming for a particular task or process. As described herein, these checks may be written into the task or process code or may be inserted by a compiler. The tasks and process program code may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention will now be described in detail with reference to the various drawings. The descriptions within the specification are merely examples used to explain various aspects of the invention. The examples are intended only as one specific embodiment of the invention and are not meant to limit the scope of the invention. It will be apparent to one skilled in the art that the present apparatus, systems, and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

In computer systems operating in a real time environment where users expect a certain level of performance, the decision of which process to run at a particular time and how long that process should run impacts the overall performance of the system. These decisions can be made by a scheduler. The scheduler, for example, may interrupt the processor at specified intervals to switch from the execution of a lower priority task to a highest priority task currently waiting in the queue.

This is often the schedule method used in desktop computer systems. However, there are computing environments where greater performance is required, such as Web Services and extensible stylesheet language transformations (XSLT). In such environments, Service Level Agreements (SLAs) may be in place to establish Quality of Service (QoS) standards. QoS sets the requirements for the behavior of a computer system. In Web Services, the QoS standards specified in the Service Level Agreement (SLA) guarantee a certain rate of responsiveness for traffic through a Web Services proxy or a Web Services server.

To ensure that the QoS standards defined by the SLA are met, the operator of the Web Services engine typically uses a scheduler to schedule tasks. Frequently, however, a scheduler that merely interrupts the processor at a specified interval and switches the task to the current highest priority task cannot meet QoS standards. The scheduler needs to be able to flexibly suspend and resume work on various tasks and processes in an efficient manner in order to meet the SLA requirements.

Scheduling decisions and execution can be performed in a variety of ways. In a first method, the scheduler independently makes the decision about when to force a particular process to stop. The scheduler forces the process to suspend and saves the state of the process so that the process can be restarted later at the point it was halted. This method allows processes to be written without any knowledge of the scheduler or QoS. Although there are advantages to this approach, such as ease of use and universal applicability, it has performance limitations which greatly reduce its ability to meet stringent QoS requirements. For example, this method is often inefficient because the scheduler forces processes to suspend and resume no matter what they are currently doing or how much time it might take to finish.

The second method is called cooperative multi-tasking. In cooperative multi-tasking, processes have predefined yield points or parameters that allow the process to be efficiently stopped and restarted. These points must be programmed into the process, frequently with a knowledge beforehand of the scheduler and other factors in the computing environment where the process will be executed. The advantage to this approach is performance. For example, if a process only needs a small amount of time to finish, there is no yield point provided so that the task finishes rather than consuming time and resources to suspend and later resume. The drawbacks of cooperative multi-tasking include the significant programming effort required to write each process so that it will yield at opportune points within the process when it receives a suspend request from the task scheduler when the scheduler requires the process to be replaced by a higher priority process.

The present invention describes systems and methods for deciding when to suspend and resume competing, differently prioritized tasks in a real-time operating environment where stringent time performance requirements are specified. The present invention increases the efficiency of task execution by minimizing timing consumed by suspending and resuming tasks, thus allowing for more stringent requirements to be met by the system. More specifically, the present specification describes methods and system in which tasks or processes are written so as to periodically check for a suspend request from a scheduler and yield to the suspend request, if made, at particular points within the task when it would be efficient to accept a suspend request. Because the check for the suspend request is based on what is occurring with the task, the task can be written, including the suspend request checks, without knowledge of a particular computing environment, scheduler or QoS.

For ease of explanation, the terms below have been defined as they will be used in the present specification and in the appended claims.

Web Service—"Web Services" refers to Internet and intranet-based, self-contained, modular applications that perform specific tasks, and are initiated automatically by programs through the use of Internet standard technologies. Web Services employ interaction (e.g., binding, finding, etc.) implemented by the exchange of extensible Markup Language (XML) messages. Web Services make it possible to integrate systems that would otherwise require extensive development efforts. Web Services provide a simple and streamlined mechanism for applications to communicate over the Internet/intranet using established standards and technologies and without human intervention (i.e., program to program interaction), and without the need to know the environment at each end point.

Scheduler—A "scheduler" is a computer program that manages when processes are given time to run on one or more processors.

Computer Multi-tasking Environment—A "computer multi-tasking environment" is a computer environment in which multiple tasks or processes are waiting for run time on a central processor or processors. The various tasks and processes may be assigned relative priorities based on the importance of the task or a user submitting the task.

Process—A "process" is any amount of code that can be given time to run on the processor or processors.

Suspend—Unless the context indicates some other interpretation of the word, "suspend" means to save the state of a running process or task so that another process or task can run.

State—"State" refers to the status of a system at a particular point in time, including system and local variables which would be needed to completely restore a process following suspension.

Task—A "task" is the same as a process and the term is used interchangeably throughout the description.

Switch—To "switch" means to suspend one task and allow another to run.

Halt—To "halt" means to stop a task, but not necessarily permanently.

Periodic—"Periodic" is intended to take on a more general meaning of the term where the time between events is not necessarily always the same length.

Cycle—A "cycle" can be a processor cycle or an iteration of a loop.

According to one exemplary embodiment, a scheduler for a Web Services engine, or any engine in a computer multi-tasking environment, optimizes the scheduling of processes for response time and efficiency by allowing running processes to be cooperatively involved in the suspension decision. With traditional preemptive multitasking, processes or tasks running in a multi-tasking environment have no input into when they are suspended. In such a case, the running process could be suspended with only a few instructions left to execute before it finishes. Suspending this process and later resuming it only to complete a few instructions is inefficient. In some instances, the time it takes to suspend and resume the task could be significantly longer than the time it would take to allow the task to be executed to completion.

With reference now to FIG. 1, the operation of an illustrative task scheduler is shown. As noted above, the purpose of a task scheduler is to allocate computing resources efficiently based on the relative priorities of competing tasks. Consequently, consistent with relative task priorities, a task scheduler may be configured to switch tasks at regular intervals using a timer, or it may be configured to switch tasks according to user input. There are various ways that a task scheduler can use to decide when to switch tasks. The time spent by the scheduler not specifically suspending and resuming tasks will be considered idle time herein even though the scheduler may be performing other operations. The scheduler in an idle state is represented by the "Task Scheduler Idle" box (10).

The decision box (11) labeled "Suspend Task?" represents the various processes that the task scheduler could use to determine when a task should be suspended. When a decision is made to suspend a currently running task, the scheduler raises a flag, sends a message, or uses other means to communicate to the running task that it needs to be suspended. This step is represented by the box "Send Suspend Request to Task" (12).

At this point, the task scheduler waits for the task to respond to the request to suspend. The task scheduler may poll for a response from the task or respond to an interrupt. The method of monitoring the task that is under a suspend request can vary, but there are two parameters that the scheduler can monitor illustrated in decision boxes (13*a*) and (13*b*). The first parameter is compliance by the task to the suspension request as shown in box (13*a*). The second parameter is the expiration of a time limit for compliance that is determined by the scheduler as shown in box (13*b*). Thus, the scheduler essentially waits for the task to comply with the suspend request until a timer has expired. If the task complies with the suspend request before the time limit expires, which should happen under normal conditions, then the scheduler proceeds to suspend the task illustrated by the "Suspend Task" block (14*a*). If the time limit expires, the scheduler then forces the task to suspend as shown by the "Force Suspend Task" block (14*b*). The final step is for the scheduler to start or resume the next task to be run (15), after which it returns back to the idle state (10) until a task needs to be suspended or started.

A specific example of a computing environment where it is advantageous to efficiently prioritize tasks is a processor conducting extensible stylesheet language transformations (XSLT). XSLT is used for the transformation of extensible markup language (XML) documents into other XML or "human readable" documents. XSLT is most commonly used to convert data between different XML schemas or to convert XML data into hypertext markup language (HTML) documents. XSLT is widely used and allows significant flexibility in sharing and processing information.

Consequently, a XSLT server may be tasked with compiling down multiple XSLT documents. The performance demands on such an XSLT server, such as an IBM WebSphere server, can be significant. To fulfill the users' requests in a timely manner, the XSLT tasks would optimally be processed in a way that allows yielding low priority tasks at very small time slices or whenever the scheduler requires it. Ideally, a scheduler system for XSLT applications would intelligently suspend tasks at points that promote efficiency without requiring an extensive programming effort to rewrite the tasks.

As described above, a process that is in progress can cooperatively contribute to the decision of when it (the process) should be suspended. To increase the efficiency of the scheduling procedure, the processes are written so that they yield to the scheduler at times when saving their current state is easy and the overhead of task switching is minimized. In the XSLT environment, this is done by inserting checks in the XSLT code at key places to make sure that there is a high likelihood of the task of yielding to the scheduler within a very short amount of time after receiving a request to do so. As used in this specification and appended claims, the term "check" or "checks" refers to a decision point or points inserted into the operation of a process at which it is most convenient for the process to suspend its operation.

Figure 2:
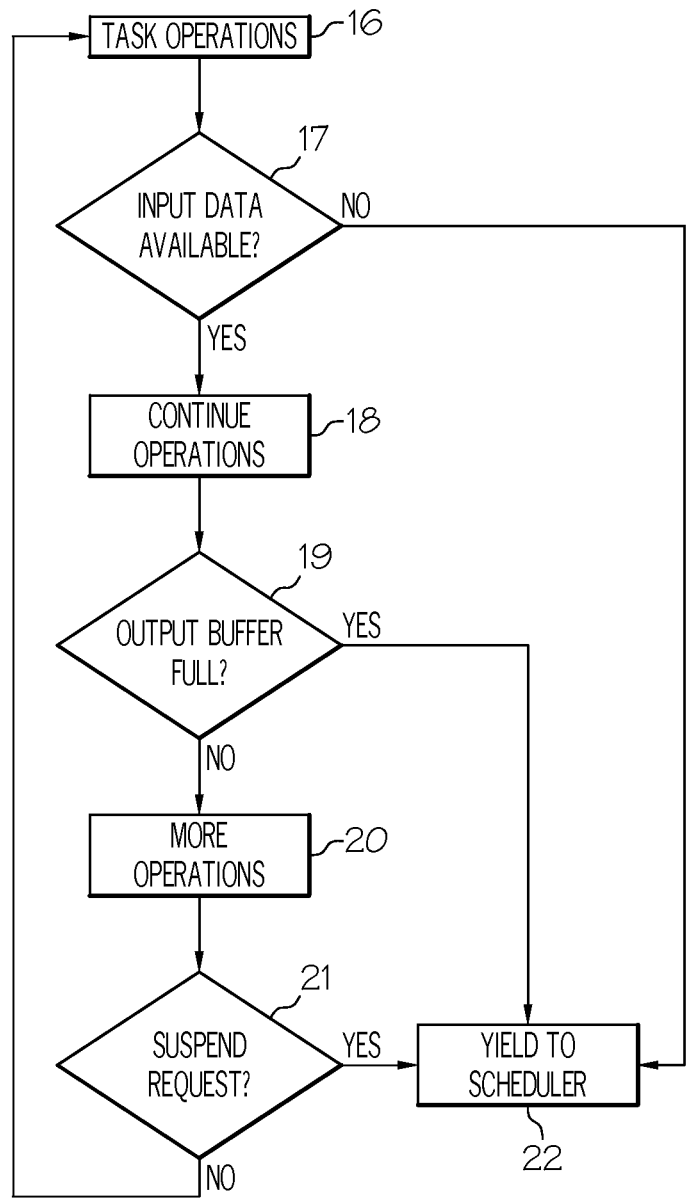
FIG. 2 is an illustrative flow chart which depicts one exemplary process by which various checks that a task or function called by a task may use to ensure that the task yields to the task scheduler within a specific time limit, according to principles described herein.

With reference now to FIG. 2, the compiled task code has three checks shown (17), (19), and (21). The first check is the input data check (17). The input data check (17) is performed whenever the task needs more input. The task determines if the required input data is available. If the required input data is unavailable, the task will be idle until the input data becomes available. Consequently, if the required input data is unavailable, the task should efficiently suspend execution, because the task would be idle waiting for input data if not suspended. Consequently, when the task reaches a point in its execution that it needs input data, the task will be programmed to check for a suspend request from the scheduler and will yields to the suspend request if the required input data is unavailable.

While this input check (17) will increase efficiency and performance, it may not alone produce the checks as frequently as needed to meet desired QoS standards. Consequently, additional checks will be described that can be implemented with the input check to further increase efficiency and performance. It will be understood that the input check (17), and other checks described herein, do not need to occur in any particular order, but rather occur as dictated by the operation of the task in which they are implemented. Rather, the input check (17), for example, occurs at any time when a task needs to obtain input data. If the task does not require any input data, an input check (17) included in the process code may not be utilized or may be eliminated from the code entirely.

Another check implemented under the principles described herein is the output buffer check (19). The output buffer check (19) gives the task periodic chances to yield to a suspend request if the data being output is not yet being used. Whenever the task is generating output to a buffer, the task will be programmed to periodically check whether the amount of output data in the buffer exceeds a specific threshold. This threshold is selected based on the use of the output data from the buffer and indicates a minimum period of time before the output data in the buffer will be exhausted. If the output buffer check (19) determines that the output buffer is full or has an amount of data exceeding the specified threshold, further execution of the task at that point in time will be inefficient. Consequently, the task could then efficiently comply with a suspend request rather than continuing to produce output data for an already-full buffer. Thus, if the output buffer check (19) determines that the output buffer is full or has an amount of data exceeding the specified threshold, the task will check for a suspend request from the scheduler and comply with the suspend request if one has been issued. As indicated above with respect to the input check (17), the output buffer check (19) does not need to happen in any particular order relative to any other checks performed. Moreover, if the task does not generate output data to a buffer, the output buffer check (19) can be ignored or eliminated from the task code.

The third check according to the principles described herein is the suspend request check (21), which is as shown as a "Suspend Request?" box. This check (21) occurs periodically within the task to see if there is a request to suspend the task from the scheduler. According to one exemplary embodiment, the suspend request check (21) in an XSLT environment is inserted at the beginning of every template. In an alternative embodiment, the suspend request check (21) can be done with minimal cycles of additional overhead by merging it into other checks that are necessary at the beginning of every task or template such as checking to see if the stack is overrun, etc.

As indicated above, the structure of FIG. 2 is not meant to imply that the checks must happen in any particular order nor are the corresponding "Operations" boxes (16), (18), and (20) meant to suggest that operations must happen between checks or in any particular order. If any of the checks indicate that the task needs to yield to the scheduler, the task proceeds to "Yield to Scheduler" (22) allowing the scheduler to suspend the current task and start or resume a higher priority task.

After implementing the three checks (17, 19, 21) described above, a remaining issue that could leave the system prone to slowly and inefficiently yielding to scheduler suspend requests is a single large template that is extremely computationally intensive without reading in any additional input or writing any additional output. In such a case, the checks (17, 19, 21) are less effective in providing yield points to comply with a suspend request because the computationally intensive template does not require input data or produce output data. Further, the suspend request check (21) placed at the beginning of the computationally intensive template would be ineffective after the process began.

However, most computationally intensive operations inside of an XSLT template are actually done via XSLT extension functions, XPATH functions, etc. According to one exemplary embodiment, these functions can be written with internal checks similar to those described above. The XSLT extension functions would then be written to yield to the scheduler in the same manner in as the tasks described above.

Thus the problem reduces to native XSLT code, which does not utilize extension functions and is extremely computationally intensive without reading in any additional input or writing any additional output. In this case, the risk can be mitigated by performing an analysis in the compiler that detects any processing period that could be in this category (e.g. a loop that could go for many iterations without generating any new output), and then inserting explicit yield checks at these points during the writing of the task. By way of example and not limitation, in a task that includes a large number of loop iterations without needing input data or producing output data to be buffered, these yield checks could be inserted after a specific number of iterations, such as every thousand iterations.

Figure 3:
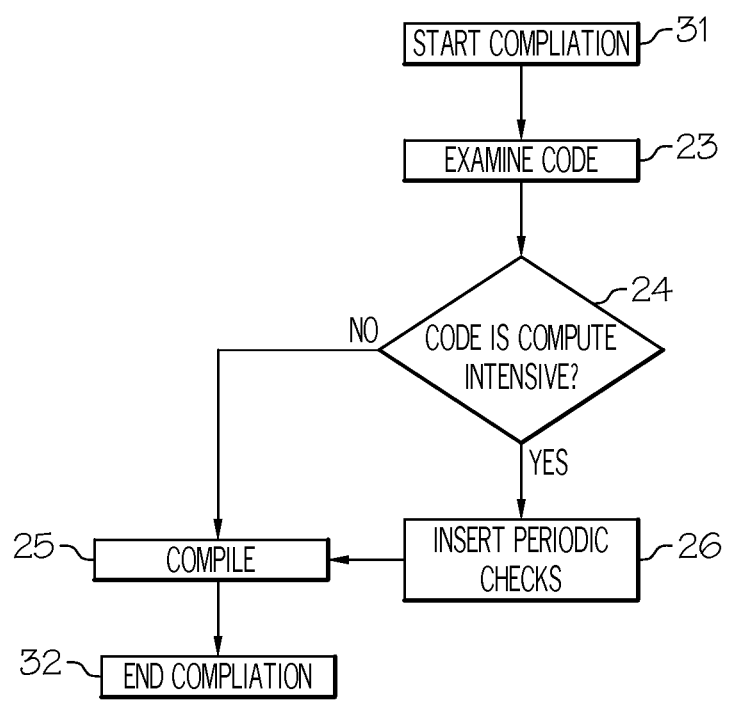
FIG. 3 is an illustrative flow chart which depicts one exemplary process by which a compiler could add checks to a computationally intensive function during compilation, according to principles described herein.

Accordingly, FIG. 3 is an illustrative diagram showing one exemplary embodiment of a method of compiling code which inserts yield checks into specific categories of computationally intensive code. The compiler or, in the example of an XSLT translator system, the XSLT translator, starts the compilation process (31) and examines the code (23) to be recompiled or translated. The compiler then determines if the code has computationally intensive algorithms such as a loop that goes on for many iterations without reading or writing data (24).

If the code is computationally intensive, the compiler inserts a check or checks so that the scheduler periodically has a chance to suspend the task (26). After this check is inserted, the compiler continues with the remainder of the compilation process as it would normally (25). At the conclusion of the compilation process, the compilation task ends (32).

Figure 4:
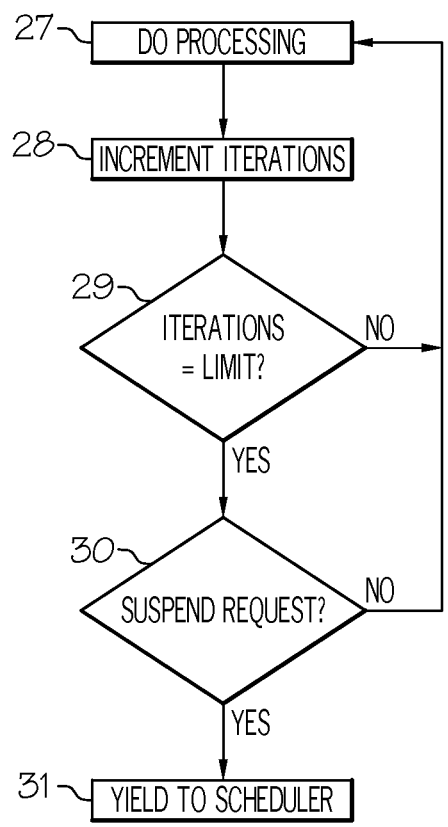
FIG. 4 is an illustrative flow chart which depicts one exemplary process by which a computationally intensive function which does not read in any new data or output any new data for numerous cycles is written so that it suspends the repetitive calculations periodically to check for a suspend request, according to principles described herein.

FIG. 4 is an illustrative flow chart which depicts one exemplary process by which a computationally intensive function which does not read in any new data or output any new data for numerous cycles is configured such that it halts the repetitive calculations periodically to check for a suspend request from a controlling scheduler. The computationally intensive function begins running after the insertion of a periodic check during compilation as described above with reference to FIG. 3. The computationally intensive function performs its designed processing operations (27).

According to one exemplary embodiment, when the computationally intensive function reaches an iterative loop or other iterative process, a counter is progressively incremented at each iterative step (28). The computationally intensive function periodically checks to see if the iteration counter has reached a given limit value or values (29). If the iterations have reached a defined limit, the task or function checks to determine if it is under a suspend request from the scheduler (30). If there is a suspend request, the task or function yields to the scheduler (31). If there is not a suspend request, the task or function returns to its operations.

Because only computationally intensive sections of a task are modified by the insertion of a check as described herein, the amount of extra computation is negligible compared to the overall amount of computation. Thus, the task that has entered a computationally intensive routine can still cooperatively contribute in a decision of whether to suspend, thereby increasing the efficient operation of the multi-tasking environment.

The preceding description has been presented only to illustrate and describe embodiments and examples of the principles described. This description is not intended to be exhaustive or to limit these principles to any precise form disclosed. For example, there may be many types of compute-intensive functions, besides XSLT systems, that do not read or write data for an extended period of time. These functions could also be identified and an appropriate check inserted to allow the process to yield to a suspend request from the scheduler in a timely fashion as described above. By way of example and not limitation, the appropriate check may be time or resource based instead of iteration based.

In sum, a scheduler system when configured as described in FIGS. 1 through 4 and the accompanying text, will have increased capability to meet quality of service standards contained within service level agreements. The task scheduler is designed in such a way that it allows tasks that the scheduler is trying to suspend to continue running until the task yields to the scheduler based on what is occurring within the execution of that task. By allowing a currently executing task to cooperatively make the decision about when to yield, the suspension and resumption of tasks can be more efficiently performed. The tasks are designed such that when they reach periodical points where yielding to the scheduler would be more efficient, the tasks check to determine if the scheduler has requested that the tasks suspend their operation. The tasks then yield to the scheduler, allowing the scheduler to execute tasks according to the relative order of their priority. These checks can be advantageously written into the task by a programmer or inserted by a compiler without any specific knowledge of the scheduler or QoS.

For example, a task which requires input data may check to see if there is any new data available to it and yields to the scheduler if there is no new data available or after a particular amount of input has been received. A task that is generating new data will check the output buffer where the output data is being stored and yield to the scheduler when the amount of output data has reached a set limit. Tasks also periodically check to see if they are receiving a request to suspend from the task scheduler and yield to the scheduler at that time. Additionally, if the tasks do not reach a yield point within a reasonable time, the task scheduler will force a task to suspend. Functions used by a task are implemented in a similar manner as the tasks themselves.

Computationally intensive functions used by a task that do not consume any new data or output any new data for many cycles are written in a way that they periodically pause and check to see if they need to be suspended by the task scheduler and yield to the scheduler if there is a request to suspend. A compiler compiles code to be executed in a multi-tasking environment in such a way that it searches for computationally intensive functions described above and inserts into them the required periodic checks to allow it to yield to the scheduler within a set time limit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of handling multiple tasks in a cooperative multi-tasking extensible stylesheet language transformations (XSLT) server, the method comprising:
   preparing XSLT code of a XSLT task by a XSLT translator, said preparing including inserting a plurality of suspend checks into said XSLT code, wherein a suspend check comprises an instruction which when executed causes said XSLT task to determine whether a scheduler has issued a suspend request to said XSLT task and to yield to said scheduler when said determination is positive, said inserting including said XSLT translator:
   identifying one or more input portions of said XSLT code which consume input data when executed and inserting an input suspend check at each identified input portion;
   identifying one or more output portions of said XSLT code which produce output data when executed and inserting an output suspend check at each identified output portion;
   identifying each template of said XSLT code and inserting a template suspend check at the beginning of each identified template; and
   identifying one or more iterative portions of said XSLT code which do not include any non-native XSLT code and any of said inserted input, output, and template suspend checks, and inserting, into each identified iterative portion, a periodic suspend check configured to be executed periodically during execution of the identified iterative portion;
   executing said prepared XSLT code of said XSLT task on a computer processor; and
   issuing, by said scheduler, said suspend request to said executing XSLT task when a task with a priority higher than that of the executing XSLT task is waiting in a queue ready to execute.

2. The method of claim 1, wherein said output suspend check is configured to be executed when an amount of output data in a buffer receiving the output data exceeds a threshold.

3. The method of claim 1, wherein said input suspend check is configured to be executed when said XSLT task needs input data that is not currently available.

4. The method of claim 1, wherein said input suspend check is configured to be executed when said XSLT task has consumed a threshold amount of input data.

5. The method of claim 1, wherein said periodic suspend check being configured to be executed periodically comprises:
   incrementing a counter at each iteration of the corresponding iterative portion; and
   when the counter reaches a predefined limit, executing said periodic suspend check.

6. The method of claim 1, further comprising said scheduler forcing said executing XSLT task to suspend if said executing XSLT task has not responded to an issued suspend request within a time limit.

7. A cooperative multi-tasking extensible stylesheet language transformations (XSLT) system for handling multiple tasks, the system comprising:
   at least one processor;
   a computer-readable medium accessible to said processor and storing code including instructions which, when executed by said processor, cause said system to implement a method comprising:
      preparing XSLT code of a XSLT task by a XSLT translator, said preparing including inserting a plurality of suspend checks into said XSLT code, wherein a suspend check comprises an instruction which, when executed by said processor, causes said XSLT task to determine whether a scheduler has issued a suspend request to said XSLT task and to yield to said scheduler when said determination is positive, said inserting including said XSLT translator:
         identifying one or more input portions of said XSLT code which consume input data when executed and inserting an input suspend check at each identified input portion;
         identifying one or more output portions of said XSLT code which produce output data when executed and inserting an output suspend check at each identified output portion;
         identifying each template of said XSLT code and inserting a template suspend check at the beginning of each identified template; and
         identifying one or more iterative portions of said XSLT code which do not include any non-native XSLT code and any of said inserted input, output, and template suspend checks, and inserting, into each identified iterative portion, a periodic suspend check configured to be executed periodically during execution of the identified iterative portion;
      executing said prepared XSLT code of said XSLT task; and
      issuing, by said scheduler, said suspend request to said executing XSLT task when a task with a priority higher than that of the executing XSLT task is waiting in a queue ready to execute.

8. The system of claim 7, wherein said output suspend check is configured to be executed when an amount of output data in a buffer receiving the output data exceeds a threshold.

9. The system of claim 7, wherein said input suspend check is configured to be executed when said XSLT task needs input data that is not currently available.

10. The system of claim 7, wherein said input suspend check is configured to be executed when said XSLT task has consumed a threshold amount of input data.

11. The system of claim 7, wherein said periodic suspend check being configured to be executed periodically comprises:
   incrementing a counter at each iteration of the corresponding iterative portion; and
   when the counter reaches a predefined limit, executing said periodic suspend check.

12. The system of claim 7, further comprising said scheduler forcing said executing XSLT task to suspend if said executing XSLT task has not responded to an issued suspend request within a time limit.

13. A computer program product comprising a non-transitory computer-readable medium storing code including instructions which, when executed by a processor, perform a method of handling multiple tasks in a cooperative multitasking extensible stylesheet language transformations (XSLT) server, the method comprising:
   preparing XSLT code of a XSLT task by a XSLT translator, said preparing including inserting a plurality of suspend checks into said XSLT code, wherein a suspend check comprises an instruction which when executed causes said XSLT task to determine whether a scheduler has issued a suspend request to said XSLT task and to yield to said scheduler when said determination is positive, said inserting including said XSLT translator:
   identifying one or more input portions of said XSLT code which consume input data when executed and inserting an input suspend check at each identified input portion;
   identifying one or more output portions of said XSLT code which produce output data when executed and inserting an output suspend check at each identified output portion;
   identifying each template of said XSLT code and inserting a template suspend check at the beginning of each identified template; and
   identifying one or more iterative portions of said XSLT code which do not include any non-native XSLT code and any of said inserted input, output, and template suspend checks, inserting, into each identified iterative portion, a periodic suspend check configured to be executed periodically during execution of the identified iterative portion;
   executing said prepared XSLT code of said XSLT task on a computer processor; and
   issuing, by said scheduler, said suspend request to said executing XSLT task when a task with a priority higher than that of the executing XSLT task is waiting in a queue ready to execute.

14. The computer program product of claim 13, wherein said output suspend check is configured to be executed when an amount of output data in a buffer receiving the output data exceeds a threshold.

15. The computer program product of claim 13, wherein said input suspend check is configured to be executed when said XSLT task needs input data that is not currently available.

* * * * *